(12) United States Patent
Nicholas et al.

(10) Patent No.: US 12,168,624 B2
(45) Date of Patent: Dec. 17, 2024

(54) METHOD FOR CONTROLLING ACCRETION OF SCALE

(71) Applicant: Earth Science Laboratories, Inc., Rogers, AR (US)

(72) Inventors: David Nicholas, Gulf Breeze, FL (US); Reid Henry Bowman, Fort Collins, CO (US); John A. Hatten, Jr., Bentonville, AR (US); Freddie L. Singleton, Fruit Cove, FL (US); Douglas Brian McKenzie, Wesley Chapel, FL (US); Murray Raymond Jones, Longwarry (AU)

(73) Assignee: Earth Science Laboratories, Inc., Rogers, AR (US)

(*) Notice: Subject to any disclaimer, the term of this patent is extended or adjusted under 35 U.S.C. 154(b) by 0 days.

(21) Appl. No.: 17/905,126

(22) PCT Filed: Mar. 1, 2021

(86) PCT No.: PCT/US2021/020305
§ 371 (c)(1),
(2) Date: Aug. 26, 2022

(87) PCT Pub. No.: WO2021/174203
PCT Pub. Date: Sep. 2, 2021

(65) Prior Publication Data
US 2023/0174402 A1 Jun. 8, 2023

Related U.S. Application Data

(60) Provisional application No. 62/982,571, filed on Feb. 27, 2020.

(51) Int. Cl.
*C02F 5/10* (2023.01)
*C02F 5/12* (2023.01)
*C02F 103/42* (2006.01)

(52) U.S. Cl.
CPC ............ *C02F 5/105* (2013.01); *C02F 5/12* (2013.01); *C02F 5/125* (2013.01); *C02F 2103/42* (2013.01); *C02F 2303/08* (2013.01); *C02F 2303/14* (2013.01)

(58) Field of Classification Search
CPC .. C02F 5/105; C02F 5/12; C02F 5/125; C02F 2103/42; C02F 2303/08; C02F 2303/14; C02F 1/66; C02F 2103/023; C02F 2103/10; C02F 2103/365; C02F 2303/02; C02F 2303/04; C02F 2303/20
See application file for complete search history.

(56) References Cited

U.S. PATENT DOCUMENTS

| | | | |
|---|---|---|---|
| 3,005,777 A * | 10/1961 | Terry ................ | C11D 1/22 516/200 |
| 3,449,164 A | 6/1969 | Vinkler et al. | |
| 3,704,750 A * | 12/1972 | Miles ................ | C02F 5/105 166/308.1 |
| 4,476,930 A * | 10/1984 | Watanabe .......... | C23F 11/141 166/371 |
| 8,012,511 B1 | 9/2011 | Cummins et al. | |
| 10,093,564 B2 | 10/2018 | Nicholas et al. | |
| 11,319,231 B2 * | 5/2022 | Young ............... | C07D 235/26 |
| 2008/0202554 A1 | 8/2008 | Adair | |
| 2009/0148335 A1 | 6/2009 | Adair et al. | |
| 2010/0294984 A1 * | 11/2010 | Peng ................. | C02F 5/14 252/180 |
| 2017/0225979 A1 * | 8/2017 | Nicholas ........... | C05D 9/02 |
| 2019/0002315 A1 | 1/2019 | Nicholas et al. | |
| 2019/0345047 A1 | 11/2019 | Nicholas et al. | |

OTHER PUBLICATIONS

European Application No. 21760433.9 , "Extended European Search Report", Dec. 6, 2023, 6 pages.
International Application No. PCT/US2021/020305 , "International Search Report and Written Opinion", May 19, 2021, 9 pages.

* cited by examiner

*Primary Examiner* — Liam Royce
(74) *Attorney, Agent, or Firm* — Kilpatrick Townsend & Stockton LLP

(57) ABSTRACT

The present disclosure provides an improved scale inhibiting formulation that is effective, environmentally friendly, and does not add any organic compounds or traditional polymeric compounds to treated water. The scale inhibiting composition includes molecular clusters of polyammonium bisulfate (PABS), which can interact physically, chemically, or physio-chemically with one or more ions in the water or water-containing system being treated. That interaction inhibits scale accretion and/or removes previously formed scale.

19 Claims, 6 Drawing Sheets

METHOD FOR CONTROLLING ACCRETION OF SCALE

CROSS-REFERENCE TO RELATED APPLICATIONS

The present application claims priority to and filing benefit of U.S. Provisional Patent Application No. 62/982,571, filed on Feb. 27, 2020, which is incorporated herein by reference in its entirety.

TECHNICAL FIELD

The present disclosure relates to a method of preventing, controlling or removing scale. More particularly, one or more aspects involve the use of polyammonium bisulfate molecular clusters to either prevent scale accretion or remove previously accumulated scale.

BACKGROUND

Industrial water-containing systems are susceptible to mineral deposits forming on surfaces in contact with water, especially if the circulating water contains carbonates or bicarbonates of calcium or magnesium. The mineral deposits are referred to as "scale" and are known to be especially problematic in heated systems. A wide range of industrial, water-containing systems, such as pipelines, cooling towers, reverse osmosis water purification units, boilers, pulping processes, heat exchangers, evaporators, and crude oil and gas production and processing, are susceptible to build-up of scale on surfaces exposed to water. Deposition and build-up of scale inhibits fluid flow, inhibits heat transfer efficiency, and facilitates corrosion of pipes and other process infrastructure in contact with process fluids. Scale formation in industrial water systems can result in loss of revenues due to delays and shutdowns for cleaning and removal. Two primary approaches to addressing scale are (1) preventing scale formation and (2) removing scale from surfaces that have been partially or entirely coated with scale.

Although there are many commercially available products for decreasing or preventing scale formation in industrial water systems, there is a need for a technology that is more effective and far safer for infrastructure, e.g., pipes, containers, membrane filters, pumps, etc.

SUMMARY

Disclosed herein is a method for inhibiting scale accretion in water-containing systems, comprising: adding an aqueous formulation of water, sulfuric acid, and molecular clusters of polyammonium bisulfate (PABS clusters) to a water-containing system, wherein the concentration of the PABS clusters in the treated water-containing system is from about 0.01 ppm to about 10,000 ppm, wherein the PABS clusters comprise ammonium bisulfate, sulfuric acid, and water according to Formula I

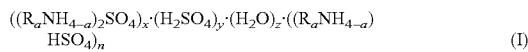

$$((R_aNH_{4-a})_2SO_4)_x \cdot (H_2SO_4)_y \cdot (H_2O)_z \cdot ((R_aNH_{4-a})HSO_4)_n \quad (I)$$

wherein each R independently is alkyl or aryl; a is 1, 2, or 3; x is at least 1, y is 0 to 5; and z is 0 to 5; and n is 1 to 20.

In some embodiments, adding PABS clusters, sulfuric acid, and water to a water-containing system comprises adding an aqueous formulation comprising PABS clusters, sulfuric acid, and water to the water-containing system. For example, a concentration of the PABS clusters in the water-based liquid ranges from 0.02 ppm to 2 ppm, and wherein a concentration of the sulfuric acid in the water-based liquid ranges from 0.03 ppm to 3 ppm (e.g., from 0.15 ppm to 0.6 ppm). In certain cases, the aqueous formulation further comprises a second inorganic acid (e.g., phosphoric acid ($H_3PO_4$), phosphonic acid ($H_3PO_3$), nitric acid ($HNO_3$), hydrochloric acid (HCl), or methane sulfonic acid ($CH_4O_3S$)).

In some embodiments, the aqueous formulation comprises 2 wt. % to 50 wt. % PABS clusters and 1 wt. % to 50 wt. % sulfuric acid, or 2 wt. % to 30 wt. % PABS clusters and 3 wt. % to 35 wt. % sulfuric acid.

In some cases, adding the aqueous formulation comprises adding from 0.01 to 100 parts of the aqueous formulation per million parts of water-based liquid in the water-containing system (ppm) on a volume to volume (v/v) basis (e.g., adding 0.5 to 5 ppm of the aqueous formulation).

In some examples, the method comprises adding phosphoric acid to the water-containing system. Optionally, the aqueous formulation and the phosphoric acid are added simultaneously, the aqueous formulation is added before the phosphoric acid is added, or the phosphoric acid is added before the aqueous formulation. In some examples, adding the aqueous formulation comprises adding 0.5 to 5 ppm of the aqueous formulation, and adding the phosphoric acid comprises adding 0.01 to 0.5 ppm of the phosphoric acid.

In one embodiment, the method comprises adding an aqueous urea hydrochloride solution to the water-containing system, wherein the aqueous urea hydrochloride solution comprises from 1 wt. % to 45 wt. % urea hydrochloride.

In some examples, the method inhibits accretion of calcium carbonate ($CaCO_3$), calcium sulfate ($CaSO_4$), strontium sulfate ($SrSO_4$), barium sulfate ($BaSO_4$), calcium phosphate [$Ca_3(PO_4)_2$], calcium fluoride ($CaF_2$), oxides of manganese (Mn), oxides of iron (Fe), or any combination thereof.

In some embodiments, the aqueous formulation is added to a water-containing system having a calcium hardness in a range of 0 to 1,200 milligrams per liter (mg/L) of liquid of the water-containing system, or a total salt concentration in a range of 0 to 40 wt. %.

In some cases, the aqueous formulation is added to a water-containing system used for oil or gas recovery and/or processing. In other cases, the aqueous formulation is added to a water-containing system comprising a desalination system, cooling tower, water purification system, boiler, heat-exchange unit, membrane filter system, irrigation system, or chlorinator system.

Optionally, the aqueous formulation is added to an oil or gas well to prevent disruption of liquid or gas flow in the oil or gas well as a result of formation and/or deposition of scale.

In some embodiments, the aqueous formulation is added to remove previously formed scale deposits while preventing formation and/or deposition of new scale deposits (i.e., scale accretion). For example, a concentration of the PABS clusters in the water-based liquid ranges from 1 ppm to 10,000 ppm, and wherein a concentration of the sulfuric acid in the water-based liquid ranges from 1.5 ppm to 15,000 ppm (e.g., from 1.5 ppm to 30 ppm).

In some examples, the PABS clusters have diameters in a range of from 1 nm to 4 μm.

Optionally, the aqueous formulation further comprises at least one additive comprising an anticorrosion additive, biocide, pH control substance, coagulant, flavor or odor control additive, or propellant.

Also described herein is a method for inhibiting scale accretion in water-containing systems, comprising: drying the PABS clusters described above to provide solid state PABS clusters; and adding solid state PABS clusters to a water-based liquid in the water-containing system.

In some embodiments, the solid state molecular clusters of polyammonium bisulfate are added to a water-containing system in an amount of about 0.01 mg per one liter of water to about 10 g per one liter of water-based liquid in the water-containing system. The water-based liquid in the water-containing system can have a conductivity in a range of 1 to 200,000 microSiemens per centimeter (µS/cm).

In certain embodiments, the method further comprises adding solid state PABS clusters, sulfuric acid, and water to a water-containing system (e.g., the PABS clusters are added simultaneously with, before, or after the sulfuric acid and water).

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

DETAILED DESCRIPTION

Figure 1:
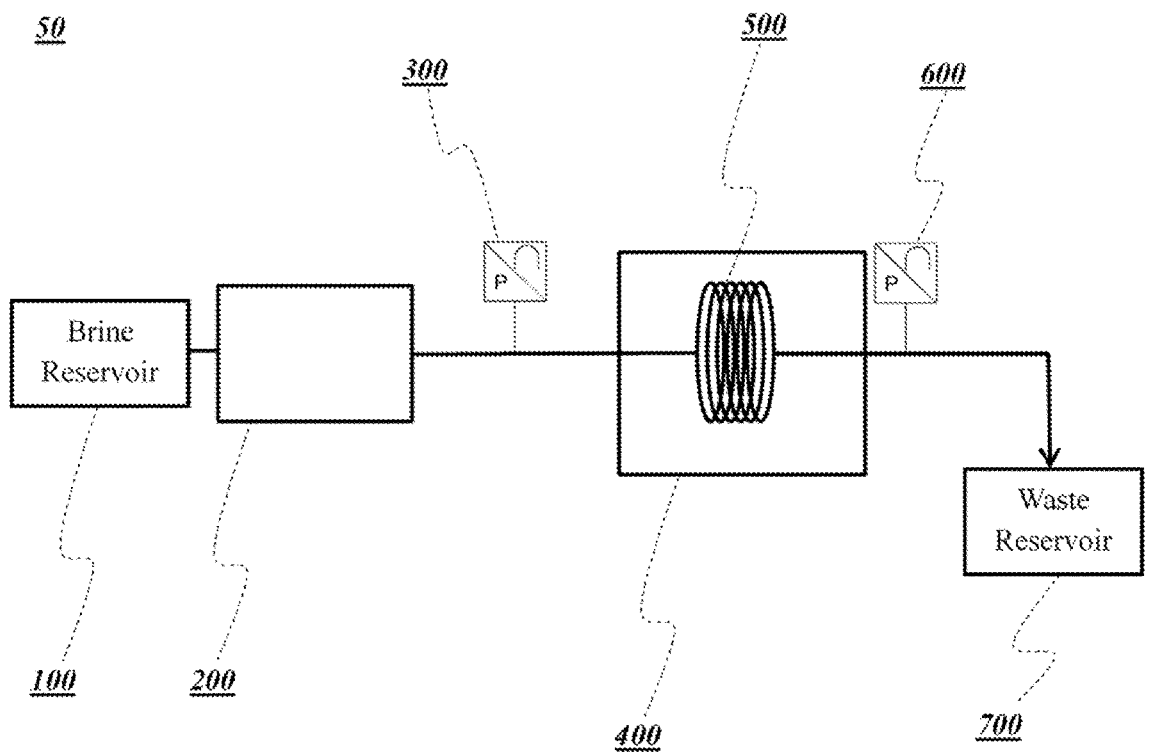
FIG. 1 is a plan view of the scale deposition test system.

The present invention provides an improved scale inhibiting formulation that is effective, environmentally friendly, and does not add any organic compounds or traditional polymeric compounds to treated water. The scale inhibiting composition includes molecular clusters of polyammonium bisulfate (PABS), which can interact physically, chemically, or physio-chemically with one or more ions in the water or water-containing system being treated. That interaction inhibits scale accretion and/or removes previously formed scale. A system treated with the scale inhibiting formulation described herein has reduced solids (e.g., solid or crystalline salt or ion reaction product) as compared to an untreated system or a system treated with a previously existing scale control product.

The present invention also provides a method of treating water to inhibit scale accretion and/or remove scale. The method includes adding the scale inhibiting formulation to water so that, after mixing, the final concentration is about 1 parts per million (ppm) of the aqueous formulation in the water-containing system being treated. The method is suitable for use with any water having a mineral content high enough to potentially cause scale accretion on surfaces adjacent to the water.

As used herein, the terms "invention," "the invention," "this invention," and "the present invention" are intended to refer broadly to all of the subject matter of this patent application and the claims below. Statements containing these terms should be understood not to limit the subject matter described herein or to limit the meaning or scope of the patent claims below.

The term "about," as used herein when referring to a measurable value such as an amount or concentration and the like, is meant to encompass variations of 10%, 5%, 1%, 0.5%, or even 0.1% of the specified amount.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

All ranges disclosed herein are to be understood to encompass any and all endpoints as well as any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g., 1 to 6.1, and ending with a maximum value of 10 or less, e.g., 5.5 to 10.

The term "and/or" when used in a list of two or more items, means that any one of the listed items can be employed by itself or in combination with any one or more of the listed items. For example, the expression "A and/or B" is intended to mean either or both of A and B, i.e., A alone, B alone, or A and B in combination. The expression "A, B and/or C" is intended to mean A alone, B alone, C alone, A and B in combination, A and C in combination, B and C in combination or A, B, and C in combination.

As used in this specification and the appended claims, the singular forms "a", "an", and "the" include singular and plural references unless the content clearly dictates otherwise.

Molecular Clusters of Polyammonium Bisulfate (PABS)

Disclosed herein are aqueous formulations that include molecular clusters of polyammonium bisulfate, referred to herein as PABS clusters or simply PABS. The PABS are molecular clusters that include molecules of at least one amine sulfate and at least one amine bisulfate, i.e., polyammonium bisulfate. It should be understood that the PABS moieties disclosed herein are in the form of molecular clusters, even if a particular reference to PABS does not specifically state that the PABS are molecular clusters. PABS clusters, as used herein, have a diameter ranging from about 1 nanometer (nm) to about 4 microns (μm) (e.g., 4000 nm).

The PABS described herein include amine sulfates and amine bisulfates formed from alkyl or aryl amines. An alkyl amine is an amine that includes at least one alkyl substituent. An aryl amine is an amine that includes at least one aryl substituent. In some examples, PABS suitable for use in the formulations and methods disclosed herein may further include molecules of water and/or molecules of sulfuric acid aggregated with the molecules of polyammonium bisulfate. Thus, in some examples, the PABS described herein can be described by Formula I:

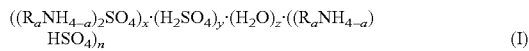

$$((R_aNH_{4-a})_2SO_4)_x \cdot (H_2SO_4)_y \cdot (H_2O)_z \cdot ((R_aNH_{4-a})HSO_4)_n \quad (I)$$

where each R independently is alkyl or aryl; a is 1, 2, or 3; x is from 1 to 5, y is from 0 to 5, z is from 0 to 5, and n is between 1 and 20.

In any formula described herein, each R independently can be alkyl or aryl. When any R is alkyl, that R can be linear or branched, and can be methyl, ethyl, propyl, butyl, pentyl, $C_1$-$C_6$, $C_1$-$C_{10}$, or $C_1$-$C_{20}$. When any R is aryl, that R can include at least 4 carbon atoms, no more than 20 carbon atoms, or from 4 to 20 carbon atoms. In some examples, the aryl substituent includes at least one heteroatom, such as nitrogen, sulfur, or oxygen. For example, if the number of carbon atoms is 4, then the aryl substituent has at least one heteroatom. Specific examples of the aryl substituent include, but are not limited to, substituted or unsubstituted phenyl, benzyl, napthyl, thiophene, furan, or pyrrole. When more than one R is present, the R substituents can be the same or different. In some examples, at least one R substituent is alkyl and at least one other is aryl.

The PABS useful in the formulations disclosed herein are acidic compounds that can be dissolved in water to form a solution that is corrosive to metals and simultaneously not corrosive to human skin. For example, a formulation described herein can include PABS dissolved in water to form a solution of about 5-50% PABS, about 10-30% PABS, or about 20-25 PABS. In some examples, the PABS solutions have a pH of about 3 or less, a pH between about 0 and about 3, or a pH between about 1 and about 2. Surprisingly, even though the PABS form a solution with a low pH, both the pure PABS and the low pH solution are non-corrosive to human skin. That is, when either the pure PABS or the low pH solution of PABS is placed on skin, no signs of reddening or irritation are felt or observed.

In certain aspects, the PABS (i.e., the molecular clusters of polyammonium bisulfate) include ammonium bisulfate, sulfuric acid, water, and a second inorganic acid. For example, the PABS can include water, sulfuric acid, polyammonium bisulfate, and any one of phosphoric acid ($H_3PO_4$), phosphonic acid ($H_3PO_3$), nitric acid ($HNO_3$), hydrochloric acid (HCl), and methane sulfonic acid ($CH_4O_3S$).

In some embodiments of the invention, the PABS clusters are dried and used in a solid state (e.g., as a powder) to treat process water. In other embodiments, the PABS are used as part of an aqueous formulation to treat process water.

Aqueous Formulations

In some embodiments of the invention, an aqueous formulation includes the PABS, sulfuric acid, and water. In one example of the invention, the aqueous formulation contains between about 1% to about 99% by weight PABS. In another embodiment of the invention, the aqueous formulation preferably contains between about 5% to about 40% by weight PABS. For example, the aqueous formulation can include about 2% by weight (i.e., 2 wt. % PABS) to about 50 wt. % PABS. Additionally, the aqueous formulation can include about 1 wt. % sulfuric acid to about 50 wt. % sulfuric acid, and water in the range of about 1 wt. % to about 90 wt. %.

In some embodiments of the invention, the aqueous formulation includes 2 wt. % to 30 wt. % PABS, 3 wt. % to 35 wt. % sulfuric acid, and 40 wt. % to 95 wt. % water. For example, the aqueous formulation can include 20 wt. % PABS, 31 wt. % sulfuric acid, and 49 wt. % water. As described herein, an aqueous formulation disclosed herein can be added to a water-containing system to inhibit scale accretion on surfaces in the water-containing system.

In certain aspects, a ratio of PABS to sulfuric acid in the aqueous formulation ranges from 2 to 20 parts PABS to 3 to 30 parts sulfuric acid based on weight of the PABS and the sulfuric acid. In a preferred embodiment, the ratio of PABS to sulfuric acid is 2:3. The ratio of PABS to sulfuric acid can range from 2:3 to 20:30.

In one embodiment of the invention, the aqueous formulation is a solution of water, sulfuric acid, PABS, and at least another material, e.g., a second inorganic acid. For example, the aqueous formulation can include water, sulfuric acid, PABS, and any one of phosphoric acid ($H_3PO_4$), phosphonic acid ($H_3PO_3$), nitric acid ($HNO_3$), hydrochloric acid (HCl), methane sulfonic acid ($CH_3SO_2OH$) or urea hydrochloride. A ratio of PABS to the inorganic acid can range from 1:1 to 1:10 (e.g., 1:2 to 1:5.6) based on the weight of the second inorganic acid. A ratio of the sulfuric acid in the aqueous formulation to the second inorganic acid can range from 1:10 to 10:1 (e.g., 1:3 to 3:1) based on the weight of the second inorganic acid. Urea hydrochloride can be added as an aqueous urea hydrochloride solution including about 1 wt. % to about 45 wt. % urea hydrochloride and from about 55 wt. % to about 99 wt. % water. A ratio of PABS to urea hydrochloride can range from 1:1 to 1:30 (e.g., 1:2 to 1:30, 1:1 to 1:29, 1:10 to 1:30, 1:5 to 1:20, or 1:3 to 1:20). The ratio of PABS to urea hydrochloride can be 1:4, 1:8, 1:12.1, 1:14.4, 1:16.6, 1:18.2, 1:20.1, 1:24.5, 1:28.7, or 1:29.9.

Phosphoric acid is known to be effective for removing scale, rust, and other hard water deposits. In some cases, the aqueous formulation including PABS, sulfuric acid, and water, is added to the water-containing system in a range of from 0.5 to 5 ppm, and phosphoric acid is added separately to the water-containing system in a range of from 0.01 to 0.5 ppm. A ratio of PABS to phosphoric acid can range from 1:1 to 1:10 (e.g., from 1:2 to 1:9, from 1:1 to 1:9, from 1:2 to 1:10). For example, the ratio of PABS to phosphoric acid can be 1:1, 1:2, 1:2.5, 1:3, 1:3.1, 1:4, 1:4.7, 1:5, 1:5.5, 1:6, 1:6.8, 1:7, 17.2; 1:8, 1:8.6, 1:9, or 1:9.9. Additionally, a ratio of sulfuric acid to phosphoric acid can range from 1:1 to 1:10 (e.g., from 1:2 to 1:9, from 1:1 to 1:9, from 1:2 to 1:10). For example, the ratio of PABS to phosphoric acid can be 1:1, 1:2, 1:2.5, 1:3, 1:3.1, 1:4, 1:4.7, 1:5, 1:5.5, 1:6, 1:6.8, 1:7, 17.2; 1:8, 1:8.6, 1:9, or 1:9.9. Such a formulation is useful for treating an aqueous process stream wherein the aqueous formulation is applied to an industrial water-containing system that is also treated with a low concentration of phosphoric acid. The phosphoric acid can be added simultaneously with the aqueous formulation (e.g., at the same time as the aqueous formulation or combined with (as a part of) the aqueous formulation), before the aqueous formulation (e.g., phosphoric acid then the aqueous formulation), or after the aqueous formulation (e.g., the aqueous formulation then the phosphoric acid).

Methods of Use

In certain aspects, the method described herein can remove scale accretion that includes calcium carbonate ($CaCO_3$), calcium sulfate ($CaSO_4$), strontium sulfate ($SrSO_4$), barium sulfate ($BaSO_4$), calcium phosphate [$Ca_3(PO_4)_2$], calcium fluoride ($CaF_2$), oxides of manganese (Mn), oxides of iron (Fe), or any combination thereof. The water-based liquid in the water-containing system can exhibit a calcium hardness in a range of from 0 milligrams per liter (mg/L) to about 1,200 mg/L. Additionally, the water-based liquid in the water-containing system can have a total salt concentration in a range of from 0 wt. % to about 40 wt. %. The chemical composition of scale will vary depending on the region from which water is obtained for industrial, commercial, or domestic use, especially in concentrations of metal ions such as calcium, magnesium, iron, etc., and several anions such as bicarbonate, carbonate, sulfate, phosphate, silicate, fluoride, etc. Regardless of the mineral salt involved, there is a common process that leads to scale formation. If the concentrations of anions and cations in the water of a water-containing system (e.g., a particulate process loop, a boiler, or the like) exceed the solubility of their reaction products, precipitates form which reduces the relative concentrations in the process water. Such reactions occur until the concentrations no longer exceed the product solubility maximum. As an example, if the concentrations of calcium and carbonate ions exceed the solubility of the reaction product, in this case, calcium carbonate, solid calcium carbonate will precipitate out of the water and may form a layer on a surface exposed to the aqueous fluid.

In one embodiment of the invention, PABS are dried and provided in a solid state (e.g., a powder). The solid state PABS can be added to a liquid process stream in a concentration of about 0.01 mg/L to about 10 g/L. Adding solid state PABS or a PABS solution to a water stream to prevent scale deposition are preferred methods of treatment.

In some examples, the invention includes adding solid state PABS or the aqueous formulation including PABS to a water-containing system described herein, such as a desalination system, cooling tower, water purification system, boiler, heat-exchange unit, membrane filter system, irrigation system, chlorinator system, or any system susceptible to scale accretion. In certain aspects, the water-based liquid in the water-containing system can have a conductivity in a range of from about 1 microSiemens per centimeter (0/cm) to about 200,000 μS/cm. In some cases, the solid state PABS or the aqueous formulation including PABS can be used in water-containing systems used for oil or gas recovery and/or processing, or oil or gas wells to prevent disruption of liquid or gas flow in the wells caused by scale accretion. Additionally, the solid state PABS or the aqueous formulation including PABS can be used to remove previously formed scale deposits while preventing accretion of new scale deposits.

A preferred embodiment of the invention is to add the solid state PABS or the aqueous formulation including PABS to an aqueous process stream where the concentration of the formulation added is between about 0.01 to about 100 ppm on a volume to volume (v/v) basis. For example, 1 milliliter (mL) of an aqueous formulation containing PABS added to 999,999 mL of an aqueous process stream would be equivalent to 1 ppm of the aqueous formulation in the treated process stream. In another preferred embodiment of the invention a PABS-containing aqueous formulation is added to an aqueous process stream wherein the concentration of the formulation added is between about 0.1 to about 10 ppm, more preferably in the range of 0.5 to 5 ppm.

In some examples, when the solid state PABS or the aqueous formulation is added to an aqueous process stream to form a treated process stream, the resulting concentration of PABS in the treated process stream is from about 0.01 ppm to about 10,000 ppm (e.g., about 0.05 ppm to about 9,999 ppm, about 0.1 ppm to about 7,500 ppm, about 0.02 ppm to about 9,900 ppm, or about 0.03 ppm to about 10,000 ppm). For example, the resulting concentration of PABS in the treated process stream is about 0.01 ppm, about 0.02 ppm, about 0.03 ppm, about 0.04 ppm, about 0.05 ppm, about 0.06 ppm, about 0.07 ppm, about 0.08 ppm, about 0.09 ppm, about 0.1 ppm, about 0.11 ppm, about 0.12 ppm, about 0.13 ppm, about 0.14 ppm, about 0.15 ppm, about 0.16 ppm, about 0.17 ppm, about 0.18 ppm, about 0.19 ppm, about 0.2 ppm, about 0.21 ppm, about 0.22 ppm, about 0.23 ppm, about 0.24 ppm, about 0.25 ppm, about 0.26 ppm, about 0.27 ppm, about 0.28 ppm, about 0.29 ppm, about 0.3 ppm, about 0.31 ppm, about 0.32 ppm, about 0.33 ppm, about 0.34 ppm, about 0.35 ppm, about 0.36 ppm, about 0.37 ppm, about 0.38 ppm, about 0.39 ppm, about 0.4 ppm, about 0.41 ppm, about 0.42 ppm, about 0.43 ppm, about 0.44 ppm, about 0.45 ppm, about 0.46 ppm, about 0.47 ppm, about 0.48 ppm, about 0.49 ppm, about 0.5 ppm, about 0.51 ppm, about 0.52 ppm, about 0.53 ppm, about 0.54 ppm, about 0.55 ppm, about 0.56 ppm, about 0.57 ppm, about 0.58 ppm, about 0.59 ppm, about 0.6 ppm, about 0.61 ppm, about 0.62 ppm, about 0.63 ppm, about 0.64 ppm, about 0.65 ppm, about 0.66 ppm, about 0.67 ppm, about 0.68 ppm, about 0.69 ppm, about 0.7 ppm, about 0.71 ppm, about 0.72 ppm, about 0.73 ppm, about 0.74 ppm, about 0.75 ppm, about 0.76 ppm, about 0.77 ppm, about 0.78 ppm, about 0.79 ppm, about 0.8 ppm, about 0.81 ppm, about 0.82 ppm, about 0.83 ppm, about 0.84 ppm, about 0.85 ppm, about 0.86 ppm, about 0.87 ppm, about 0.88 ppm, about 0.89 ppm, about 0.9 ppm, about 0.91 ppm, about 0.92 ppm, about 0.93 ppm, about 0.94 ppm, about 0.95 ppm, about 0.96 ppm, about 0.97 ppm, about 0.98 ppm, about 0.99 ppm, about 1 ppm, about 1.1 ppm, about 1.2 ppm, about 1.3 ppm, about 1.4 ppm, about 1.5 ppm, about 1.6 ppm, about 1.7 ppm, about 1.8 ppm, about 1.9 ppm, about 2 ppm, about 2.1 ppm, about 2.2 ppm, about 2.3 ppm, about 2.4 ppm, about 2.5 ppm, about 2.6 ppm, about 2.7 ppm, about 2.8 ppm, about 2.9 ppm, about 3 ppm, about 3.1 ppm, about 3.2 ppm, about 3.3 ppm, about 3.4 ppm, about 3.5 ppm, about 3.6 ppm, about 3.7 ppm, about 3.8 ppm, about 3.9 ppm, about 4 ppm, about 4.1 ppm, about 4.2 ppm, about 4.3 ppm, about 4.4 ppm, about 4.5 ppm, about 4.6 ppm, about 4.7 ppm, about 4.8 ppm, about 4.9 ppm, about 5 ppm, about 5.1 ppm, about 5.2 ppm, about 5.3 ppm, about 5.4 ppm, about 5.5 ppm, about 5.6 ppm, about 5.7 ppm, about 5.8 ppm, about 5.9 ppm, about 6 ppm, about 6.1 ppm, about 6.2 ppm, about 6.3 ppm, about 6.4 ppm, about 6.5 ppm, about 6.6 ppm, about 6.7 ppm, about 6.8 ppm, about 6.9 ppm, about 7 ppm, about 7.1 ppm, about 7.2 ppm, about 7.3 ppm, about 7.4 ppm, about 7.5 ppm, about 7.6 ppm, about 7.7 ppm, about 7.8 ppm, about 7.9 ppm, about 8 ppm, about 8.1 ppm, about 8.2 ppm, about 8.3 ppm, about 8.4 ppm, about 8.5 ppm, about 8.6 ppm, about 8.7 ppm, about 8.8 ppm, about 8.9 ppm, about 9 ppm, about 9.1 ppm, about 9.2 ppm, about 9.3 ppm, about 9.4 ppm, about 9.5 ppm, about 9.6 ppm, about 9.7 ppm, about 9.8 ppm, about 9.9 ppm, about 10 ppm, about 100 ppm, about 200 ppm, about 300 ppm, about 400 ppm, about 500 ppm, about 600 ppm, about 700 ppm, about 800 ppm, about 900 ppm, about 1000 ppm, about 1100 ppm, about 1200 ppm, about 1300 ppm, about 1400 ppm, about 1500 ppm, about 1600 ppm, about 1700 ppm, about 1800 ppm, about 1900 ppm, about 2000 ppm, about 2100 ppm, about 2200 ppm, about 2300 ppm, about 2400 ppm, about 2500 ppm, about 2600 ppm, about 2700 ppm, about 2800 ppm, about 2900 ppm, about 3000 ppm, about 3100 ppm, about 3200 ppm, about 3300 ppm, about 3400 ppm, about 3500 ppm, about 3600 ppm, about 3700 ppm, about 3800 ppm, about 3900 ppm, about 4000 ppm, about 4100 ppm, about 4200 ppm, about 4300 ppm, about 4400 ppm, about 4500 ppm, about 4600 ppm, about 4700 ppm, about 4800 ppm, about 4900 ppm, about 5000 ppm, about 5100 ppm, about 5200 ppm, about 5300 ppm, about 5400 ppm, about 5500 ppm, about 5600 ppm, about 5700 ppm, about 5800 ppm, about 5900 ppm, about 6000 ppm, about 6100 ppm, about 6200 ppm, about 6300 ppm, about 6400 ppm, about 6500 ppm, about 6600 ppm, about 6700 ppm, about 6800 ppm, about 6900 ppm, about 7000 ppm, about 7100 ppm, about 7200 ppm, about 7300 ppm, about 7400 ppm, about 7500 ppm, about 7600 ppm, about 7700 ppm, about 7800 ppm, about 7900 ppm, about 8000 ppm, about 8100 ppm, about 8200 ppm, about 8300 ppm, about 8400 ppm, about 8500 ppm, about 8600 ppm, about 8700 ppm, about 8800 ppm, about 8900 ppm, about 9000 ppm, about 9100 ppm, about 9200 ppm, about 9300 ppm, about 9400 ppm, about 9500 ppm, about 9600 ppm, about 9700 ppm, about 9800 ppm, about 9900 ppm, or about 10000 ppm.

In some aspects, the solid state PABS or the aqueous formulation described herein is used to remove previously accreted scale from the water-containing system. Accordingly, when the aqueous formulation is used for scale removal, the amount of PABS in the water can range from 1 ppm to 10,000 ppm (e.g., from 1 ppm to 9,900 ppm, from 1 ppm to 9,000 ppm, from 1 ppm to 5,000 ppm, from 1 ppm to 1,000 ppm, from 1 ppm to 100 ppm, or from 1 ppm to 20 ppm), and the sulfuric acid can range from 1.5 ppm to 15,000 ppm (e.g., from 1.5 ppm to 14,900 ppm, from 1.5 ppm to 9,000 ppm, from 1.5 ppm to 5,000 ppm, from 1.5 ppm to 1,000 ppm, from 1.5 ppm to 100 ppm, or from 1.5 ppm to 30 ppm).

In another case, the solid state PABS or the aqueous formulation described herein is used to inhibit scale accretion in the water-containing system. When the solid state PABS or the aqueous formulation is used to inhibit scale accretion, an amount of PABS in the water can range from 0.02 ppm to 2 ppm (e.g., 0.03 ppm to 1.9 ppm, 0.02 ppm to 1.9 ppm, 0.03 ppm to 2 ppm, 0.05 ppm to 1.75 ppm, or 0.1 ppm to 0.4 ppm). An amount of sulfuric acid in the water can range from 0.03 ppm to 3 ppm (e.g., 0.04 ppm to 2.9 ppm, 0.03 ppm to 2.9 ppm, 0.04 ppm to 3 ppm, 0.1 ppm to 1 ppm, or 0.15 ppm to 0.6 ppm).

In some embodiments, the methods described herein can be used in industrial water systems that include water with increased temperatures and pressures. For example, boilers and heat-exchanger units contain water at increased temperatures and are especially prone to scale formation on water contact surfaces. The water-surface interface in a boiler or heat-exchanger unit is dynamic and as a result, conditions are favorable for crystallization and deposition of scale-forming salts from the aqueous phase due to localized regions of ions becoming supersaturated. The microenvironment of the water-substratum interface is one in which scale-forming ion reaction products exceed the solubility maximum; this results in crystallization onto the water-contacting surface. Likewise, in boiler systems, scale forms from heat-driven decomposition of calcium bicarbonate which produces calcium carbonate and carbon dioxide.

Industrial water systems that have components for dissipating heat, e.g., cooling towers, evaporative condensers, etc., tend to be susceptible to adverse effects of scale formation as a result of increased concentrations of ions because of "cycle-up." The addition of water to replace that lost via evaporation increases the total amount of dissolved ions. Eventually, conditions become favorable for ionic reaction product to precipitate from the aqueous phase and deposit on water-contacting surfaces.

A preferred embodiment of the invention is to treat irrigation systems, especially those in regions wherein water contains high concentrations of dissolved minerals, to prevent or minimize scale accretion. Irrigation systems are prone to scale deposition problems such as decreased flow and clogging of nozzles, etc. Thus, as described herein, scale control in such systems should be straightforward. Likewise, in water filtration systems, the present invention should be applicable to preventing clogging of filter membranes as a result of interference with formation of mineral particles in the treated water matrix.

In certain cases, preferred embodiments of the invention include treating desalination systems, infrastructure needed for some types of mining, and petroleum production and recovery operations systems having a high salt content. For example, desalination systems use ocean water to generate high quality drinking water. The intake water contains relatively high concentrations of many ions (e.g., $Na^+$ and $Cl^-$) as well as high concentrations of microorganisms and dissolved organics. When pumped through a desalination system, the feed water is separated into a product water stream and a by-product stream; the by-product stream contains the water and low concentrations of some dissolved ions that pass through the filter membranes. The product water stream contains purified water. As used herein, "filter membrane" refers to a selectively permeable filter with pore sizes small enough for water molecules and some ions to pass through while preventing passage of molecules larger than water molecules as well as many ions. The by-product stream consists of water containing higher concentrations of dissolved materials (e.g., microorganisms, ions, dissolved organics, pretreatment additives such as coagulants and antiscalants) that could not pass through the membrane filters. The by-product stream is often referred to as the reject stream. A key consideration for by-product or reject streams is how to safely dispose of the liquid. The high salt concentrations as well as the presence of additives and naturally occurring organic compounds are problematic relative to safe processing and disposal of the by-product stream.

The solid state PABS or the aqueous formulation described herein can also be used in hydraulic fracturing. Some oil and gas production/recovery operations that involve hydraulic fracturing are also prone to problems caused by scale formation. In such processes, large volumes of water are pumped into underground formations (e.g., coal and shale) to cause breaks or fractures in the gas or oil-containing formations. Loss of production and cost of cleaning have significant adverse effects on the economics of an oil and/or gas production operation. Water that is subsequently pumped out of the fractured formation usually contains high concentrations of mineral, salts, dissolved and volatile inorganic and organic compounds, as well as additives used in the fracturing process. After the gas and/or oil recovery process, the process water cannot be directly discharged to the environment due to the adverse effects of the high salt concentrations, toxicity of inorganic and organic materials, etc. One approach to decreasing the volume of liquid is to use reverse osmosis technology to generate process water with improved physio-chemical parameters that can then be re-injected into underground formations. A key problem with such high salt-containing water (also referred to as "brine") is the tendency for scale to deposit in the purification system. When processed through a purification system, the by-product or reject water contains even higher concentrations of salts and other materials, because purified water was removed and collected for re-use. As the concentration of dissolved salts in the water stream increases, so does the tendency for said salts to form scale on surfaces exposed to the water stream.

In some embodiments, the methods described herein can be used in industrial water systems that include use of water with physio-chemical parameters that are significantly less extreme than those found in desalination and/or some mining operations. Such less extreme industrial water systems can also be adversely affected by scale accretion on surfaces. For example, a thin layer of scale on surfaces in a cooling tower will significantly decrease the heat transfer efficiency. This results in increased operational and maintenance costs.

Those skilled in the art will recognize and appreciate that the invention described herein can be used alone or in conjunction with other water additives, e.g., anticorrosion additives, biocides, pH control substances, coagulants, flavor and odor control additives, propellants, and other gas and oil well additives used for cleaning, stimulating and purging said wells, or any combination thereof, to make the treatment program more effective.

The following examples will serve to further illustrate the present invention without, however, constituting any limitation thereof. On the contrary, it is to be clearly understood that resort may be had to various embodiments, modifications, and equivalents thereof which, after reading the description herein, may suggest themselves to those skilled in the art without departing from the spirit of the invention.

EXAMPLES

The following applies generally to the Examples described herein.

FIG. 1 is a plan view of a system (the "test system"), used to simulate scale accretion and to demonstrate prevention of scale accretion using the formulations and methods described herein. An aqueous scale-forming brine solution was used to test the ability of selected product formulations. The aqueous brine solution was composed of sodium, 12,820 mg/L; potassium, 539 mg/L; calcium, 2,752 mg/L; magnesium, 1052 mg/L; strontium, 83 mg/L; sulfate, 1,254 mg/L; bicarbonate, 500 mg/L; chloride, 27,000 mg/L.

The pH of the brine formulation was measured before and after treating with an antiscalant formulation to ensure inhibition of scale formation was not due to acidification of the liquid. In the following examples, the pH of the brine solution before and after treatment was 7.0.

The brine formulation described above was prepared and certain samples of the brine were immediately treated with the aqueous formulation or a commercially available brine treatment composition. Certain other samples of the brine were not immediately treated with any brine treatment composition. As a general matter, when a brine solution is prepared, reactions are immediately initiated which result in the formation of amorphous calcium carbonate. Moreover, the concentration of solids (e.g., solid or crystalline salt or ion reaction product) in the brine can change as environmental conditions change. As a result, the amount and rate of scale accretion in a test system can be influenced by the age of the formulation as well as prevailing environmental conditions on the day of the assay. Treating samples of the brine immediately after the brine preparation ensures that the age and the environmental conditions of the untreated and the treated samples will be the same. Thus, the examples described herein provide meaningful comparisons of the scale forming properties of untreated and treated brines.

The test system shown in FIG. 1 was used to measure scale control efficacy of various formulations consistent with the present invention. Process system 50 includes a brine reservoir 100, an HPLC pump 200, a first pressure transducer 300, an oven 400, standard 1/16 inch HPLC tubing 500, a second pressure transducer 600, and a waste reservoir 700. To perform an assay, the oven 400 was preheated to 70° C. and maintained at that temperature until testing was terminated. HPLC pump 200 pumped brine solution at a flow rate of 2 mL per minute, unless otherwise specified, from brine reservoir 100 through the test system and into the waste reservoir 700.

During each assay, changes in pressure, measured in pounds per square inch (psi), in the HPLC tubing were recorded over selected periods. If scale accretion occurred, there was a reduction in the cross-sectional area for the brine solution to pass through the HPLC tube. As the cross-sectional area decreased, there was a concomitant increase in pressure needed to maintain the target flow rate. The test system was equipped with an automatic shutoff when the pump pressure reached selected maximum pressure values.

Example 1—Scale Accretion Due to an Untreated Brine

Oven 400 was preheated to 70° C. and maintained at that temperature until testing was terminated. The untreated brine solution was pumped by HPLC pump 200 at a flow rate of 2 mL per minute, from brine reservoir 100 through the test system and into waste reservoir 700. The untreated brine passed through the first pressure transducer 300, then through 36 inches of coiled standard HPLC tubing with an internal diameter of 0.05 inches heated by oven 400. The brine then passed through a second pressure transducer 600 before passing into the waste reservoir 700. Changes in pressure, measured in pounds per square inch (psi), in the HPLC tubing were recorded over selected periods, and the system was programmed to stop when the pressure exceeded a 3000 psi set-point. Results are shown in FIG. 2.

Figure 2:
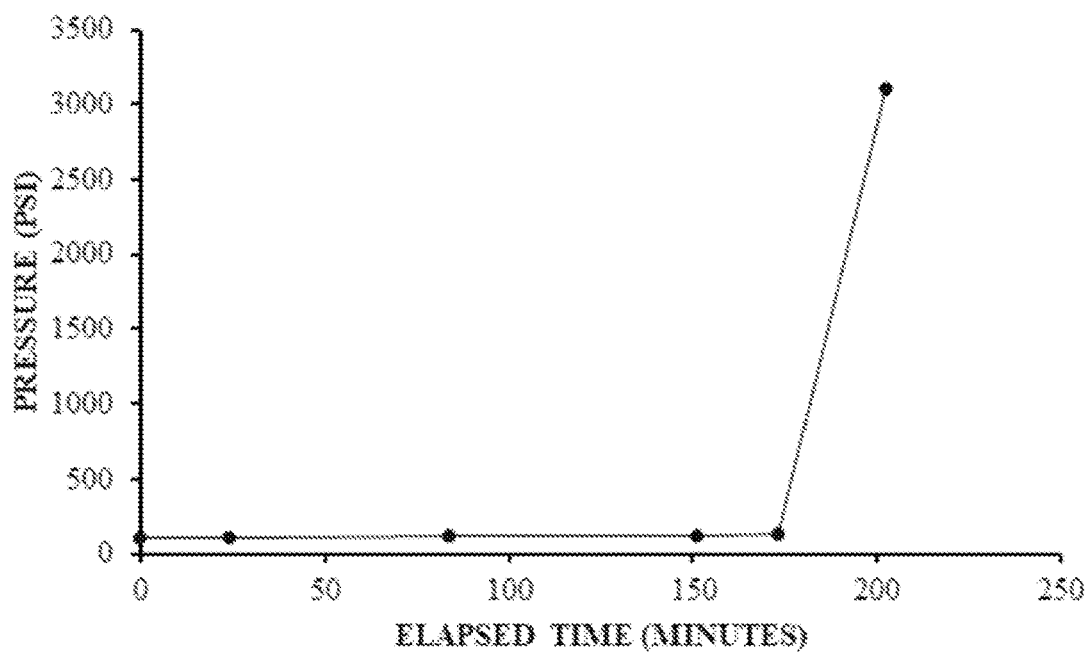
FIG. 2 is a summary of results showing clogging of HPLC tubing caused by scale accretion in a test system circulating an untreated brine solution at 2 mL/minute.

FIG. 2 is a chart of the pressure difference across the test system over time as the untreated brine solution in Example 1 was pumped through the test system. As shown in FIG. 2, there was little change in pressure during the elapsed time interval from 0 to 173 minutes. Between the 173-minute and 202-minute points, there was a rapid increase in pump pressure until the maximum pump pressure of 3,000 psi was reached and the system shut down automatically. The increase in operating pressure was due to precipitation and/or deposition of one or more components of the brine solution, which caused scale accretion on the interior surface of the HPLC tubing.

Example 2—Comparison of Scale Accretion from an Untreated Brine and from Two Brines Treated with Formulations and Methods Consistent with the Invention Example 1 was repeated with each of an untreated brine sample, a brine sample treated with 0.5 ppm v/v of ESL-SC1, and a brine sample treated with 1 ppm v/v of ESL-SC1. For each sample, the system was programmed to stop when the pressure exceeded the 1000 psi set-point. Results are illustrated in FIGS. 3-4.

Figure 3:
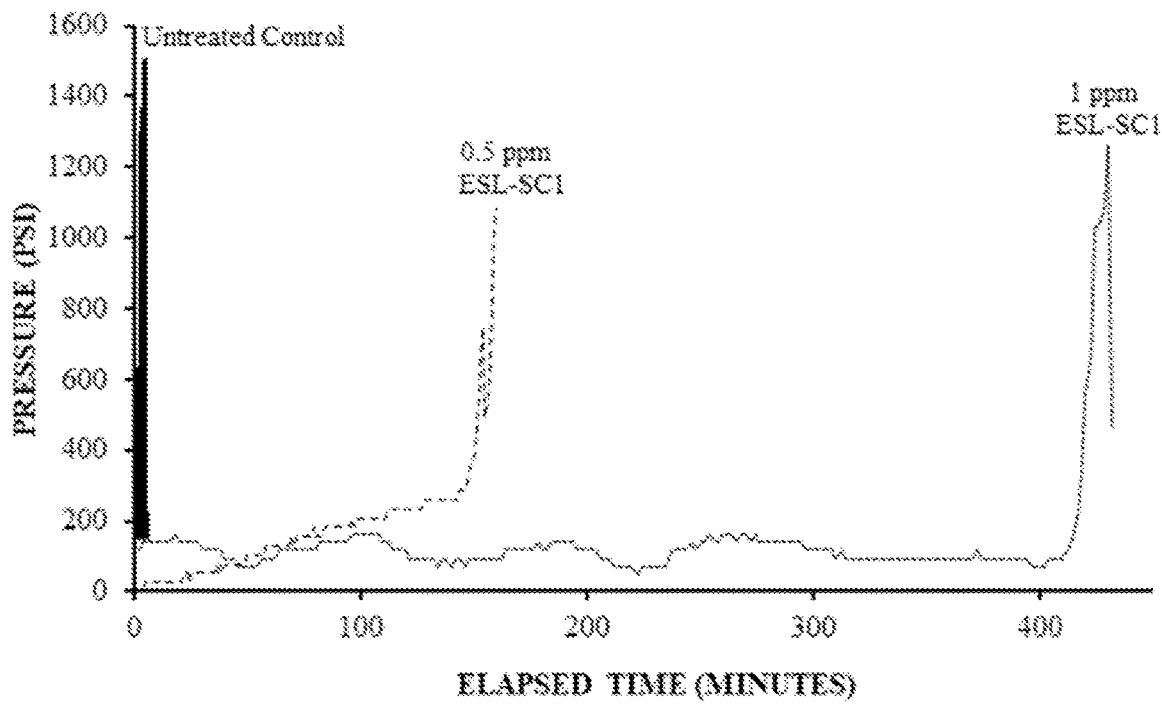
FIG. 3 is a summary of results of dose-response assays on scale accretion with brine amended with selected concentrations of ESL-SC1.

FIG. 3 is a graph of pressure as a function of elapsed time for each of the three samples. As illustrated in FIG. 3, the untreated brine exceeded the 1000 psi set-point within 5 minutes of elapsed time. Treating the brine with 0.5 ppm of ESL-SC1 extended the time to 160 minutes before set-point triggering. Increasing the ESL-SC1 to 1 ppm increased the operational time before exceeding the 1000 psi set-point to approximately 424 minutes.

Figure 4:
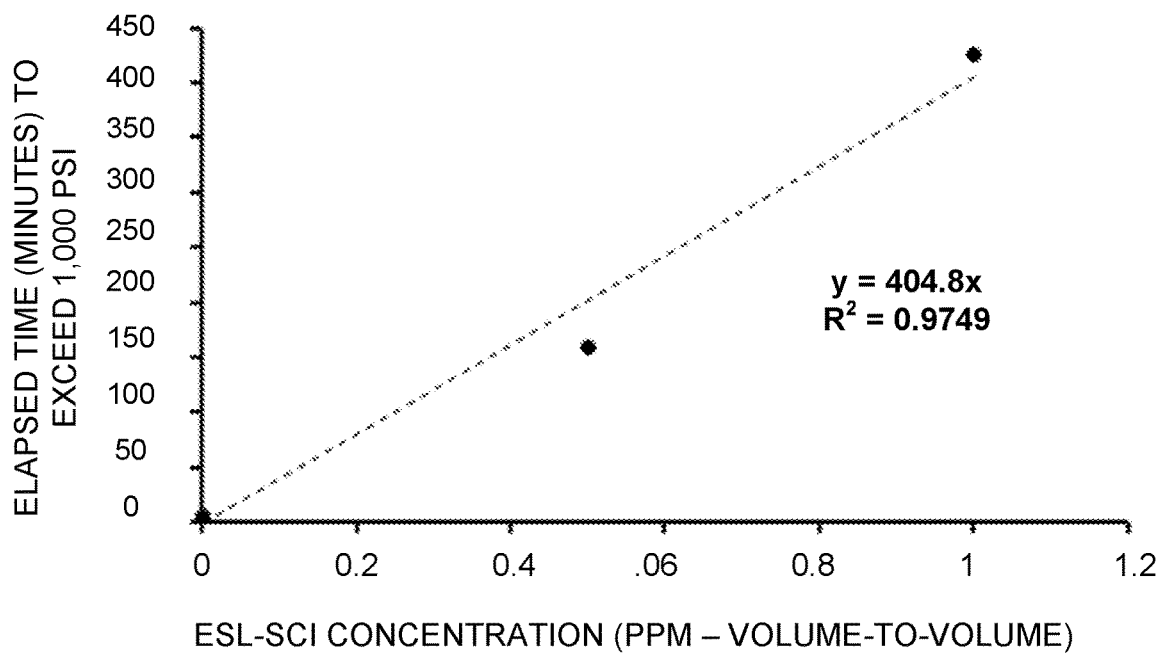
FIG. 4 is a diagram ESL-SC1 concentrations and scale accretion as measured as elapsed time for the operating pressure to increase to 1,000 psi in the test system.

FIG. 4 is a graph of elapsed time as a function of ESL-SC1 concentration increase. FIG. 4 shows that the relationship between aqueous formulation dose and scale accretion in the test system is linear.

Example 3—Comparison of Scale Accretion from an Untreated Brine, from Two Brines Treated with Commercially Available Formulations, and One Brine Treated with a Formulation and Method Consistent with the Invention Example 1 was repeated with an untreated brine sample, two brine samples that were each treated with a commercially available scale control product, and a brine sample treated with 1 ppm v/v of ESL-SC1. One of the commercially treated brines was treated with 1 ppm v/v of SCALETEC® (scale remover) (McGrayel, South Fresno, CA, USA), and the other commercially treated brine was treated with 1 ppm v/v of KLEEN-FLO® (scale preventer) (Kleen-Flo Tumbler Industries, Ltd., Brampton, Ontario, Canada). For each sample, the system was programmed to stop when the pressure exceeded a 500 psi set-point. Results are shown in FIG. 5.

Figure 5:
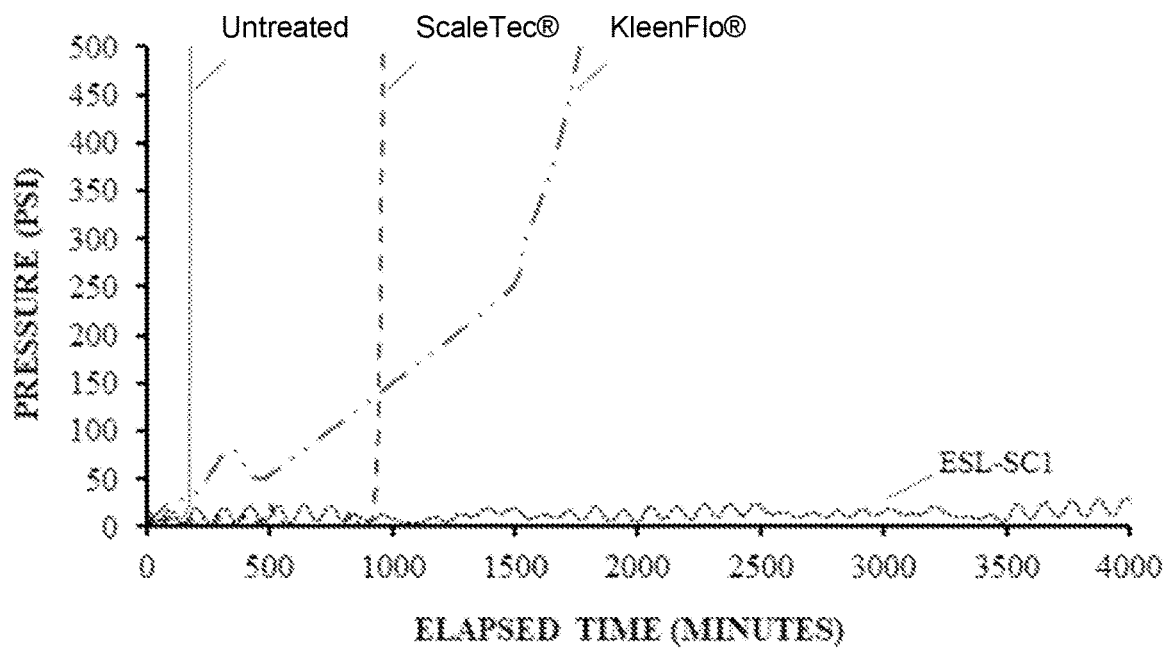
FIG. 5 is a diagram of results of scale accretion in untreated brine and brine treated 1 part per million (ppm) on a volume-to-volume basis of the indicated product formulations.

Results of the separate experiments on scale accretion in the HPLC tubing are summarized in FIG. 5. In these studies, the operating set-point of 500 psi was used to avoid scale deposition from completely clogging the HPLC tubing. Scale accretion in the system testing untreated brine caused a rapid increase in pump pressure after approximately 170 minutes and, after an additional 30 minutes, the system shutdown when the maximum operating set-point of 500 psi was reached. The system testing SCALETEC®-treated brine maintained a low pump pressure for approximately 920 minutes, after which the pump pressure increased rapidly over 40 minutes until the 500 psi automatic shut-off was triggered. The system testing KLEEN-FLOR-treated brine had a gradual, uneven increase in pump pressure until the system shut-off at 500 psi after 1780 minutes (ca. 30 hours). In contrast to the systems testing untreated and commercially-treated brines, the system testing the ESL-SC1-treated brine never even reached the 500 psi system shut-off pressure set point. Instead, it continued to operate at low pump pressure until the experiment was terminated after 4,000 minutes (66.7 hours).

Example 4—Comparison of Scale Accretion from an Untreated Brine and from Three Brines Treated with Formulations and Methods Consistent with the Invention Example 1 was repeated with an untreated brine sample and for each of three samples of brine treated with ESL-SC1 and phosphoric acid (PA). One of the treated brine sample was treated with an aqueous formulation having an ESL-SC1 concentration of 0.11125 ppm and a PA concentration of 0.106 ppm. Another of the treated brine samples was treated to a concentration of 0.225 ppm ESL-SC1 and 0.021 ppm PA. The final treated brine sample was treated to a concentration of 0.45 ppm ESL-SC1 And 0.043 PA. For each sample, the system was programmed to stop when the pressure exceeded a 250 psi set-point. Results are shown in FIG. 6.

Figure 6:
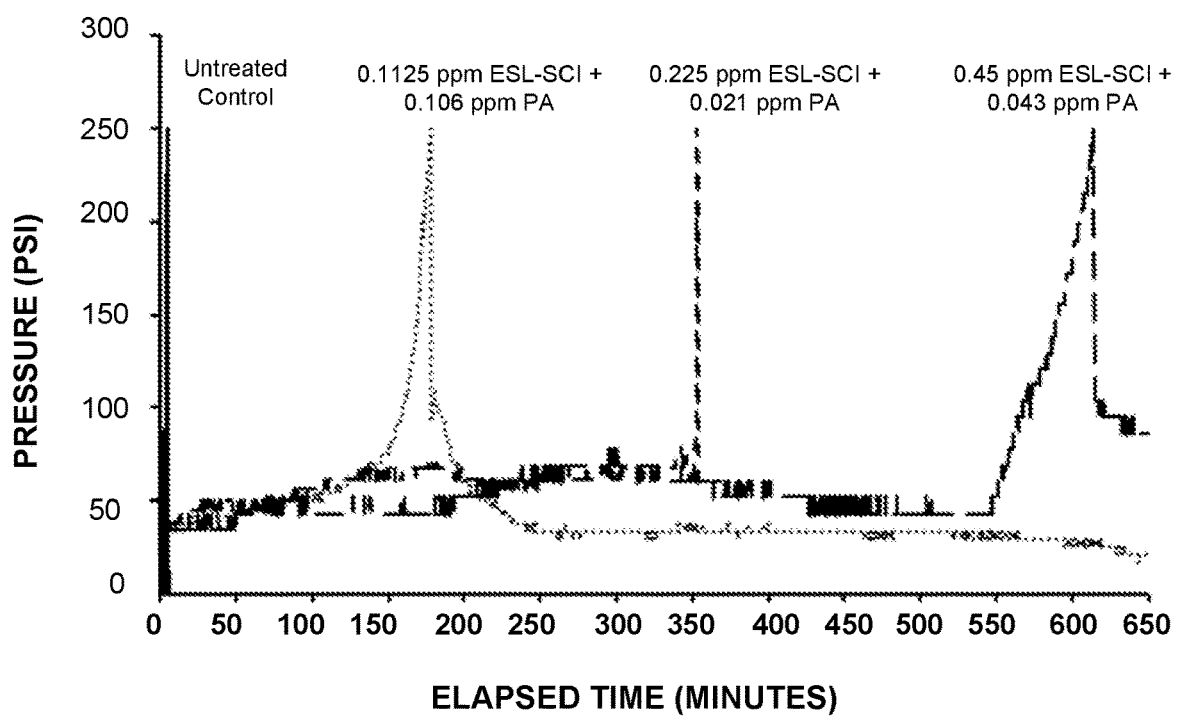
FIG. 6 is a diagram of results of dose-response assays on scale accretion with brine amended with selected concentrations of ESL-SC1 prepared with 8.5% percent phosphoric acid.

As illustrated in FIG. 6, low concentrations of ESL-SC1, in combination with phosphoric acid, were especially effective in preventing scale accretion. Brine treated to a concentration of about 0.5 ppm ESL-SC1 v/v and phosphoric acid did not display a significant increase in operating pressure until more than 550 minutes had elapsed. A comparison with the result of brine treated with 0.5 ppm ESL-SC1, as illustrated in FIG. 3, demonstrates the presence of phosphoric acid in the formulation increased the time to clogging from 160 minutes for ESL-SC1 without phosphoric acid (FIG. 3) to approximately 613 minutes for ESL-SC1+phosphoric acid (FIG. 6).

Example 5—Scale Accretion from an Untreated Brine Including 100 mg/L Fe

Figure 7:
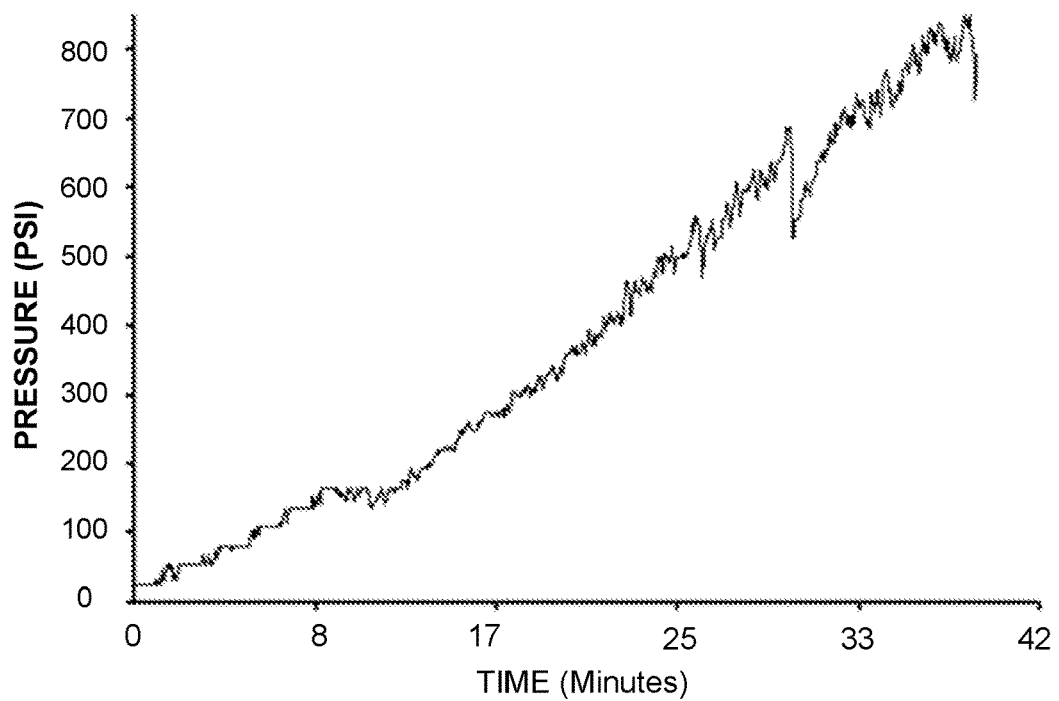
FIG. 7 is a diagram of results of scale accretion with brine amended with 100 parts per million (ppm) (weight to volume) of Fe (mg/L added as $FeSO_4 \cdot 7H_2O$) at a flow rate of 2 mL/minute.

The scale deposition system was used to measure scale deposition from untreated brine including 100 mg/L Fe (added as $FeSO_4 \cdot 7H_2O$). In this example, there was a gradual increase in operating pressure as scale accretion occurred. When the line pressure reached 800 psi after approximately 41 minutes, the test system was shut-off (FIG. 7). This graph in FIG. 7 demonstrates that Fe-including brine had a strong tendency for scale accretion as indicated by the rapid increase in operating pressure which indicated clogging in the HPLC tubing.

Figure 8:
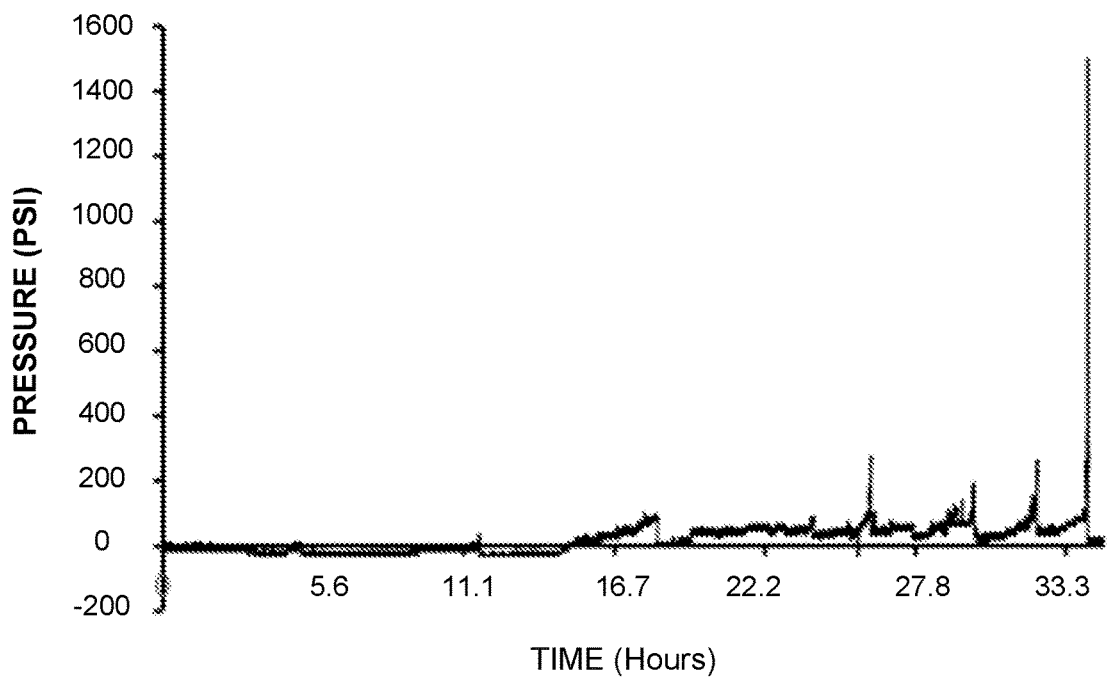
FIG. 8 is a diagram of results of scale accretion with brine amended with 50 parts per million (ppm) (weight to volume) of Fe (added as $FeSO_4 \cdot 7H_2O$) and treated with 5 ppm (volume-to-volume basis) of ESL-SC1 with a flow rate of 2 mL/minute.

Example 6—Scale Accretion from Brine Including 100 mg/L Fe and Treated with Formulations and Methods Consistent with the Present Invention As illustrated in FIG. 7, including 100 ppm Fe in the brine solution resulted in measurable increases in operating pressure within the first minutes of pumping at 2 mL/minute. Therefore, a lower dose of Fe in the brine solution was used to evaluate efficacy of ESL-SC1 to affect rate of scale accretion in a brine that included Fe. 50 mg/L Fe was added to an untreated brine solution (added as $FeSO_4 \cdot 7H_2O$). ESL-SC1 was added to achieve a total concentration of 5 ppm ESL-SC1 on a v/v basis, e.g., 5 μL of ESL-SC1 for each liter of the Fe-including brine solution. As illustrated in FIG. 8, the treated, Fe-including brine solution was pumped through the test system for approximately 34 hours before the pump pressure increased beyond the set point. Low pressure variations in pump pressure between about 16 hours and about 30 hours were likely the result of some scale accretion. This would account for pressure increases in the 100-300 psi range caused by particulates temporarily occluding flow of the brine solution. When the line pressure reached 1500 psi, the auto-shutoff was activated, and the study was terminated. These results demonstrate that ESL-SC1 had a significant effect on inhibiting scale accretion in brine including 50 ppm Fe.

Example 7—Scale Formation on Electrodes of Saltwater Chlorinator

The efficacy of ESL-SC1 to prevent scale formation on electrodes of a swimming pool saltwater chlorinator (SWC) was evaluated in recreational swimming pools. Lifetime analysis of pools operating 8 hours per day with a chlorine production output rate of 100% indicated the typical operational life of chlorinator electrodes was about three years. In this example, studies were carried out to determine if the typical operational life of the chlorinator electrodes was affected by the presence of a low concentration of ESL-SC1.

For these studies, modifications to commercially available Davey BMSC 13 chlorinators, manufactured by Davey Water Products (Scoresby, Australia), were made to allow for accelerated testing. As manufactured, the Davey BMSC 13 chlorinator produces the equivalent of 13 grams of chlorine gas per hour for sanitizing saltwater swimming pool water. The electrodes of the chlorinator are composed of common plates of titanium with a coating of ruthenium oxide and are manufactured by NMT Electrodes, Canning Vale, Australia. The NMT electrodes are known to have a typical operating life of approximately 8,000 hours when used in saltwater swimming pool water with a NaCl concentration of more than 3,000 ppm. The electrical load for the electrodes in the chlorinator was measured to be 326 Amperes per square meter ($A/m^2$).

The approach to measure efficacy of ESL-SC1 to prevent scale formation on the electrodes of chlorinators was to modify the size of the ruthenium oxide coated titanium plates. For this, the size of the electrode plates was reduced to 25% of the original size. In order to maintain the amperage load, the smaller electrodes were powered with a power supply from a BMSC 26 chlorinator. This combination of components provided an amperage density of 3-4 times the 300 $A/m^2$ design. The modified electrodes and more powerful power supplies represented "cells" that were installed in the flow-through chlorinator units.

Untreated Control: A baseline for the modified chlorinator electrodes was established by operating two cells in parallel with an indoor saltwater pool with the following parameters: water temperature 34° C., total dissolved solids >4000 ppm, free chlorine concentration=1.8 ppm, and operating pH in the range of 7.3-7.7. The modified electrodes were operated continuously with an amperage density that ranged from 900-1100 $A/m^2$ which was approximately 4 times the normal load. During this study, the cells were cleaned with a 10% HCl solution monthly as is typical of a properly maintained saltwater swimming pool.

Figure 9A:
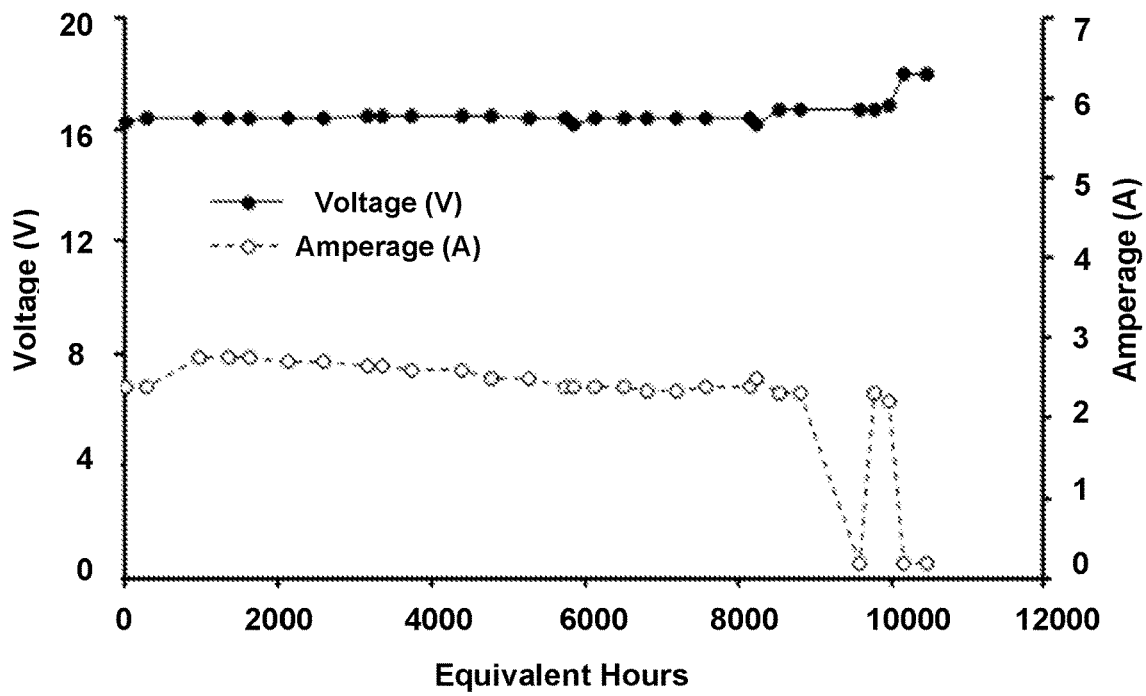
FIG. 9 is a diagram the effect of ESL-SC1 on the operational life of electrodes in chlorinators. "A" illustrates a typical operational life of electrodes in a saltwater pool treated with standard maintenance products. "B" illustrates the effect of adding ESL-SC1 to the saltwater pools.

As illustrated in FIG. 9A, the average voltage (V) and amperage (A) values for the two modified test cells demonstrated a loss of function (e.g., electrode failure) after operating for approximately 8,800 hours, which is consistent with the typical operational life for chlorinator electrodes. The cells failed within 20 hours of each other. The average amperage for the two cells (at 9,600 hours) was 0.2 A, a value considered to indicate the cells were non-functional. The cells were then cleaned by a routine soak in a 10% HCl bath. This resulted in temporary restoration of function that lasted for less than 200 hours which was followed by a period of approximately 300 hours during which the cells were non-functional. Because the manufacturer of the commercial chlorinator cells indicates that properly maintained units should have an operation life of approximately 8,000 hours, the results obtained with the modified electrodes, e.g., those reduced in size and operated continuously with an increased electrical load, were considered to be useful for determining if a change in the water treatment program had a positive or negative impact on the operational life of a full-size chlorinator.

Treated Pool: New reduced size test cells were then tested for functionality in a saltwater pool treated with ESL-SC1. This experiment was designed to replicate conditions of the untreated pool study. This study occurred in two phases. For phase 1 of the study, the experimental electrodes were installed in a chlorinator used to sanitize an indoor saltwater pool. Key water chemistry parameters were:

Indoor Conditions (Phase 1):
 Water temperature=34° C. (±1° C.)
 pH=7.3-7.6
 Hardness=200 ppm
 Total Dissolved Solids=4000 ppm.

After approximately 11,000 hours, the chlorinators were moved to an outdoor saltwater pool (so the study could continue while local COVID-19 regulations were followed by the investigators).

Outdoor Conditions (Phase 2):
 Water temperature=initially 24° C., decreasing to 18° C. after 22 weeks and then increasing as ambient temperatures increased)
 pH=7.3-7.6
 Hardness=200 ppm
 Total Dissolved Solids=3000 ppm.

During this study, the cells were operated with an amperage density >800 $A/m^2$. Also, as before in the untreated pool, the cells were cleaned monthly by soaking in 10% HCl. Visual observations of the electrodes were recorded monthly. Surprisingly, after one month, the plates were observed to be clean and did not need cleaning.

Figure 9B:
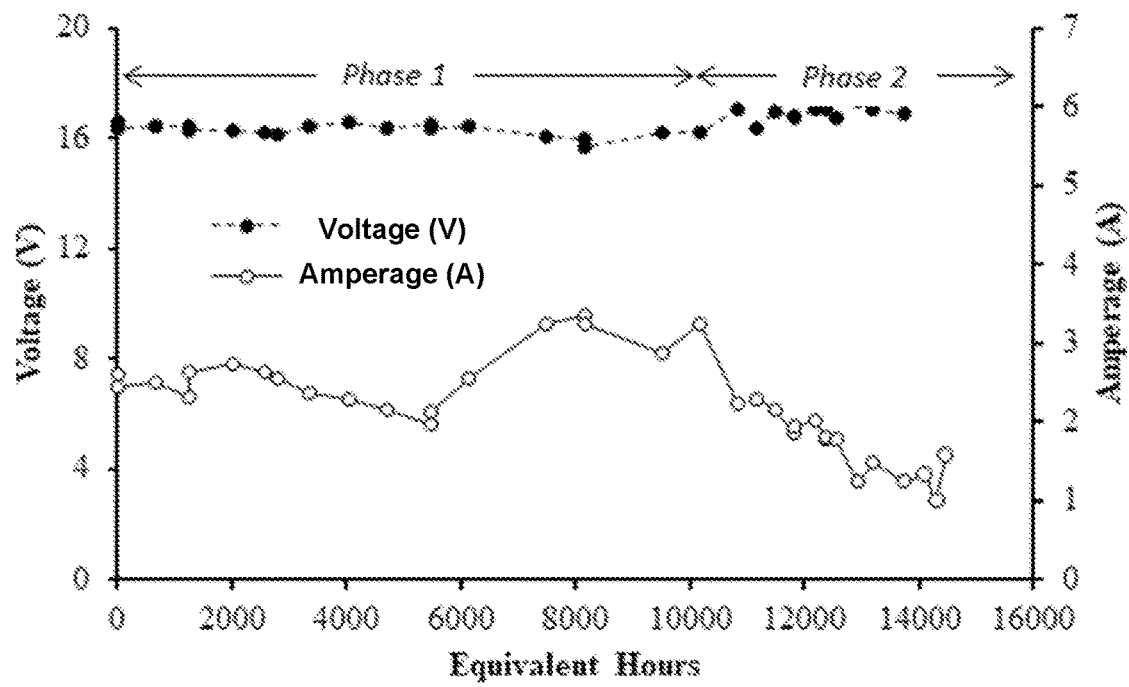

As illustrated in FIG. 9B, during phase 1 of the trial the average voltage to the two test cells was relatively constant in a range of about 16 V to about 16.5 V. Likewise, the average amperage values remained in a range of about 6 A to about 8 A. Treatments for "B" included:

Phase 1=32 ppm v/v ESL-SC1 at Time=0 followed by monthly additions of 1.2 ppm v/v doses of ESL-SC1; and Phase 2=50 ppm ESL-SC1 at Time=0 of Phase 2 (11,000 hours relative to total trial) followed by monthly additions of 1.2 ppm ESL-SC1 v/v to compensate for ESL-SC1 lost due to routine backwashes of the filters. Standard pool maintenance products and procedures were also used.

After moving the test cells to an outdoor pool for phase 2 of the trial, the amperage decreased even though the voltage remained constant. The decreased amperage readings were considered to be a result of decreased conductivity caused by decreased water temperature in the outside saltwater pool. After approximately 10,000 hours, there was a gradual increase in average voltage supplied to the electrodes and concomitant decreases in amperage; these changes were due to lower water temperatures as the seasons transitioned from Summer to Winter. After approximately 14,500 hours (e.g., after the Winter season), as the water temperatures increased during the Spring, the average amperage values started to increase, a reflection of the well-known effect of temperature on conductivity. Not only did this confirm the conclusion that changes in average voltages and amperages were due to water temperature-influenced conductivity changes, but it was also obvious that the test cells remained operational well beyond 8800 hours, and there was no indication the cells were approaching the end of their operational life even at 15,000 hours. At the end of phase 2 of this study, the test cells had lasted for approximately two-times longer than those used in the untreated pool.

Example 8

Figure 10:
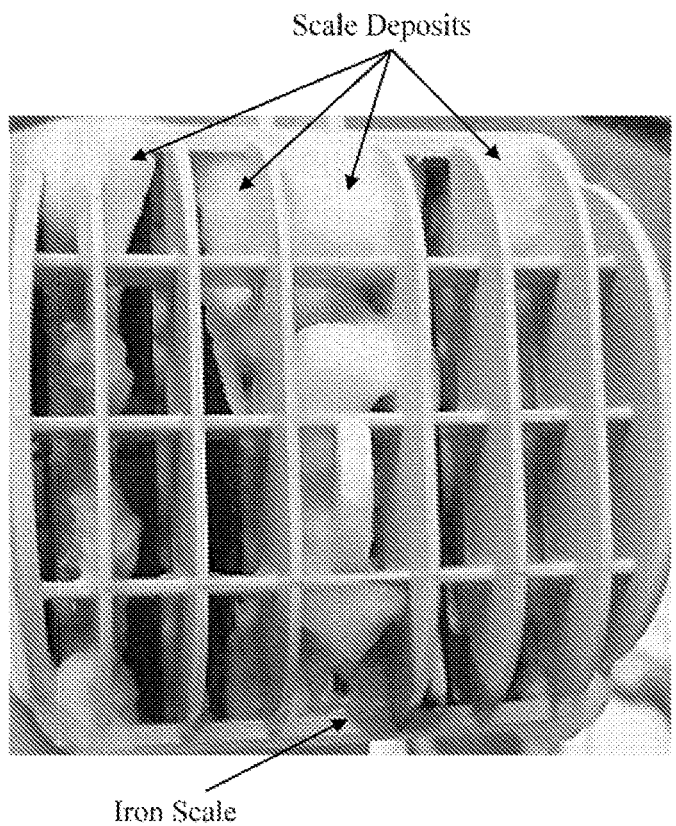
FIG. 10 is a diagram of scale deposition on a saltwater chlorinator electrolytic cell after 20 days of operation in a pool not treated for scale deposition.

Scale prevention on a saltwater chlorinator (SWC) was also evaluated by comparing visible scale formation on chlorinators operated in pool water with and without ESL-SC1. As illustrated in FIG. 10, after a 20-day trial, there was significant scale accretion in the environs of the SWC. The scale had the appearance of being composed primarily of $CaCO_3$, a result common in the swimming pools where the testing was carried out.

During the operation of the SWC, two reactions take place at the cell surface:

$$2H_2 + 2e^- \rightarrow 2OH^- + H_2$$

$$2Cl^- \rightarrow Cl_2 + 2e^-.$$

The subsequent reaction that occurs immediately after formation of $Cl_2$ is:

$$Cl_2 + H_2O \rightarrow HOCl + HCl.$$

The chemical reactions described above are well known to one skilled in the art. Likewise, it is well known that operating a SWC will result in a gradual increase in the pH of the water which will favor scale accretion. When reaction 1 occurs, $H_2$ gas is produced concomitantly with the formation of two hydroxyl ions (OH−). The result of this reaction is the formation of a localized increase in pH which favors formation and precipitation of calcium carbonate scale as illustrated in FIG. 10.

Figure 11:
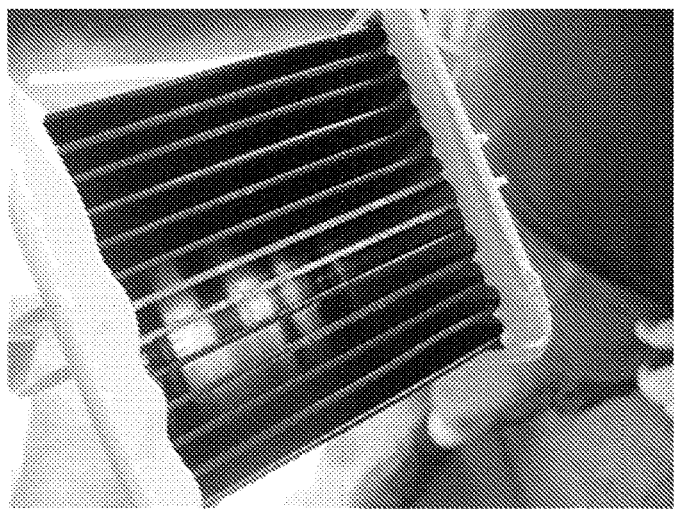
FIG. 11 is a diagram of the absence of scale deposition on a saltwater chlorinator electrolytic cell after 20 days of operation in a pool not treated for scale deposition.

The ability of ESL-SC1 to mitigate scale accretion on the electrodes of a SWC was evaluated by installing a new chlorinator cell and operating it in pool water. The initial treatment with ESL-SC1 was the addition of 10 ppm v/v of ESL-SC1. After the initial dose of ESL-SC1, the pool water was circulated and treated with standard pool maintenance products (e.g., KLEEN-FLO®, SCALETEC®) as per standard guidelines and regulations. To compensate for ESL-SC1 lost due to routine backwashes of the filters, monthly addition of about 1.2 ppm v/v of the product were made. Accretion of scale on the salt-water chlorinator cell and along the edge of the interior surface of the pool at the air-water interface were evaluated by regular visual inspection. At no time during the 20-day trial were visible scale deposits observed (see FIG. 11).

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. Although many of the examples presented herein involve specific combinations of method acts or system elements, it should be understood that those acts and those elements may be combined in other ways to accomplish the same objectives.

All patents, publications, and abstracts cited above are incorporated herein by reference in their entireties. Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. A method for inhibiting scale accretion in water-containing systems, comprising:
    adding water, sulfuric acid, and molecular clusters of polyammonium bisulfate ("PABS clusters") to a water-based liquid in a water-containing system to form a treated water-containing system,
    wherein a concentration of the PABS clusters in the treated water-containing system is from about 0.01 ppm to about 10,000 ppm, and
    wherein the PABS clusters comprise ammonium bisulfate, sulfuric acid, and water according to Formula I $$((R_aNH_{4-a})_2SO_4)_x \cdot (H_2SO_4)_y \cdot (H_2O)_z \cdot ((R_aNH_{4-a})HSO_4)_n \quad (I)$$

wherein each R independently is alkyl or aryl; a is 1, 2, or 3; x is at least 1, y is 0 to 5; and z is 0 to 5; and n is 1 to 20.

2. The method of claim 1, further comprising combining the water, the sulfuric acid, and the PABS clusters to form an aqueous formulation and adding the aqueous formulation comprising the water, the sulfuric acid, and the PABS clusters to the water-containing system.

3. The method of claim 1, wherein the concentration of the PABS clusters in the water-based liquid ranges from 0.1 ppm to 4 ppm, and wherein the concentration of the sulfuric acid in the water-based liquid ranges from 0.15 ppm to 0.6 ppm.

4. The method of claim 2, wherein the aqueous formulation further comprises a second inorganic acid, and wherein the second inorganic acid comprises phosphoric acid ($H_3PO_4$), phosphonic acid ($H_3PO_3$), nitric acid ($HNO_3$), hydrochloric acid (HCl), or methane sulfonic acid ($CH_4O_3S$).

5. The method of claim 2, wherein the aqueous formulation comprises 2 wt. % to 50 wt. % PABS clusters and 1 wt. % to 50 wt. % sulfuric acid.

6. The method of claim 2, wherein adding the aqueous formulation comprises adding from 0.01 to 100 parts of the aqueous formulation per million parts of water-based liquid in the water-containing system (ppm) on a volume to volume basis.

7. The method of claim 2, further comprising adding phosphoric acid to the water-containing system, wherein the aqueous formulation and the phosphoric acid are added simultaneously, or wherein the aqueous formulation is added before the phosphoric acid is added, or wherein the phosphoric acid is added before the aqueous formulation.

8. The method of claim 7, wherein adding the aqueous formulation to the water-containing system comprises adding 0.5 to 5 ppm of the aqueous formulation to the water-containing system, and wherein adding the phosphoric acid to the water-containing system comprises adding 0.01 to 0.5 ppm of the phosphoric acid to the water-containing system.

9. The method of claim 2, further comprising adding an aqueous urea hydrochloride solution to the water-containing system, wherein the aqueous urea hydrochloride solution comprises from 1 wt. % to 45 wt. % urea hydrochloride.

10. The method of claim 1, wherein the method inhibits accretion of calcium carbonate ($CaCO_3$), calcium sulfate ($CaSO_4$), strontium sulfate ($SrSO_4$), barium sulfate ($BaSO_4$), calcium phosphate [$Ca_3(PO_4)_2$], calcium fluoride ($CaF_2$), oxides of manganese (Mn), oxides of iron (Fe), or any combination thereof.

11. The method of claim 2, wherein the water-based liquid has a calcium hardness in a range of 0 to 1,200 milligrams per liter (mg/L) of the water-based liquid.

12. The method of claim 2, wherein the water-based liquid has a total salt concentration in a range of 0 to 40 wt. %.

13. The method of claim 2, wherein the water-based liquid is used for oil or gas recovery and/or oil or gas processing.

14. The method of claim 2, wherein the aqueous formulation is added to a water-containing system comprising a desalination system, cooling tower, water purification system, boiler, heat-exchange unit, membrane filter system, irrigation system, or chlorinator system.

15. The method of claim 2, wherein the aqueous formulation is added to an oil or gas well to prevent disruption of liquid or gas flow in the oil or gas well as a result of formation and/or deposition of scale.

16. The method of claim 2, wherein the aqueous formulation is added to remove previously formed scale deposits while preventing formation and/or deposition of new scale deposits.

17. The method of claim 16, wherein a concentration of the PABS clusters in the water-based liquid ranges from 1 ppm to 10,000 ppm, and wherein a concentration of the sulfuric acid in the water-based liquid ranges from 1.5 ppm to 15,000 ppm.

18. The method of claim 1, wherein the PABS clusters have diameters in a range of from 1 nm to 4 µm.

19. The method of claim 2, wherein the aqueous formulation further comprises at least one additive comprising an anticorrosion additive, biocide, pH control substance, coagulant, flavor or odor control additive, or propellant.

\* \* \* \* \*